(12) United States Patent
Hayes et al.

(10) Patent No.: US 12,014,917 B2
(45) Date of Patent: Jun. 18, 2024

(54) APPARATUSES, SYSTEMS, AND METHODS FOR ELLIPTICAL ATOMIC OBJECT TRAPS

(71) Applicant: Quantinuum LLC, Broomfield, CO (US)

(72) Inventors: David Hayes, Broomfield, CO (US); Philip Makotyn, Arvada, CO (US); Russell Stutz, Broomfield, CO (US); Mary Rowe, Boulder, CO (US); Benjamin Spaun, Westminster, CO (US); Brian Estey, Louisville, CO (US); Thomas Loftus, Lake Stevens, WA (US)

(73) Assignee: Quantinuum LLC, Broomfield, CO (US)

( * ) Notice: Subject to any disclaimer, the term of this patent is extended or adjusted under 35 U.S.C. 154(b) by 306 days.

(21) Appl. No.: 17/533,587

(22) Filed: Nov. 23, 2021

(65) Prior Publication Data

US 2022/0199391 A1 Jun. 23, 2022

Related U.S. Application Data

(60) Provisional application No. 63/199,279, filed on Dec. 17, 2020.

(51) Int. Cl.
*H01J 49/42* (2006.01)
*G06N 10/20* (2022.01)

(52) U.S. Cl.
CPC ............ *H01J 49/422* (2013.01); *G06N 10/20* (2022.01)

(58) Field of Classification Search
CPC ............................... H01J 49/422; G06N 10/20
USPC .................................................. 250/281, 282
See application file for complete search history.

(56) References Cited

U.S. PATENT DOCUMENTS

| 2015/0048246 A1* | 2/2015 | Green | H01J 49/36 |
| | | | 250/294 |
| 2017/0092477 A1* | 3/2017 | Giles | H01J 49/0027 |
| 2021/0319999 A1 | 10/2021 | Makotyn et al. | |

FOREIGN PATENT DOCUMENTS

EP 3839980 A2 6/2021
WO 2020/219586 A1 10/2020

OTHER PUBLICATIONS

European Search Report and Search Opinion received for EP Application No. 21215443.9, dated May 30, 2022, 11 pages.

(Continued)

*Primary Examiner* — Nicole M Ippolito
(74) *Attorney, Agent, or Firm* — Alston & Bird LLP

(57) ABSTRACT

The disclosure provides an atomic object trap apparatus and a method of operating such. The atomic object trap apparatus comprises two or more radio frequency (RF) electrodes formed concentrically in a substantially elliptical shape; and three or more trapping and/or transport (TT) electrode sequences formed concentrically in a substantially elliptical shape. The two or more RF electrodes and the three or more TT electrode sequences define a substantially elliptically-shaped atomic object trap. At least one TT electrode sequence of the three or more TT electrode sequences is disposed concentrically between the two or more RF electrodes. Each RF electrode and TT electrode sequence is elliptically shaped such that each comprises two substantially parallel longitudinal regions and two arc-spanning beltway regions, the four regions forming a substantially elliptical shape. The method is directed to operating a quantum computing system comprising an example atomic object trap apparatus.

20 Claims, 7 Drawing Sheets

(56) References Cited

OTHER PUBLICATIONS

Figure 1:
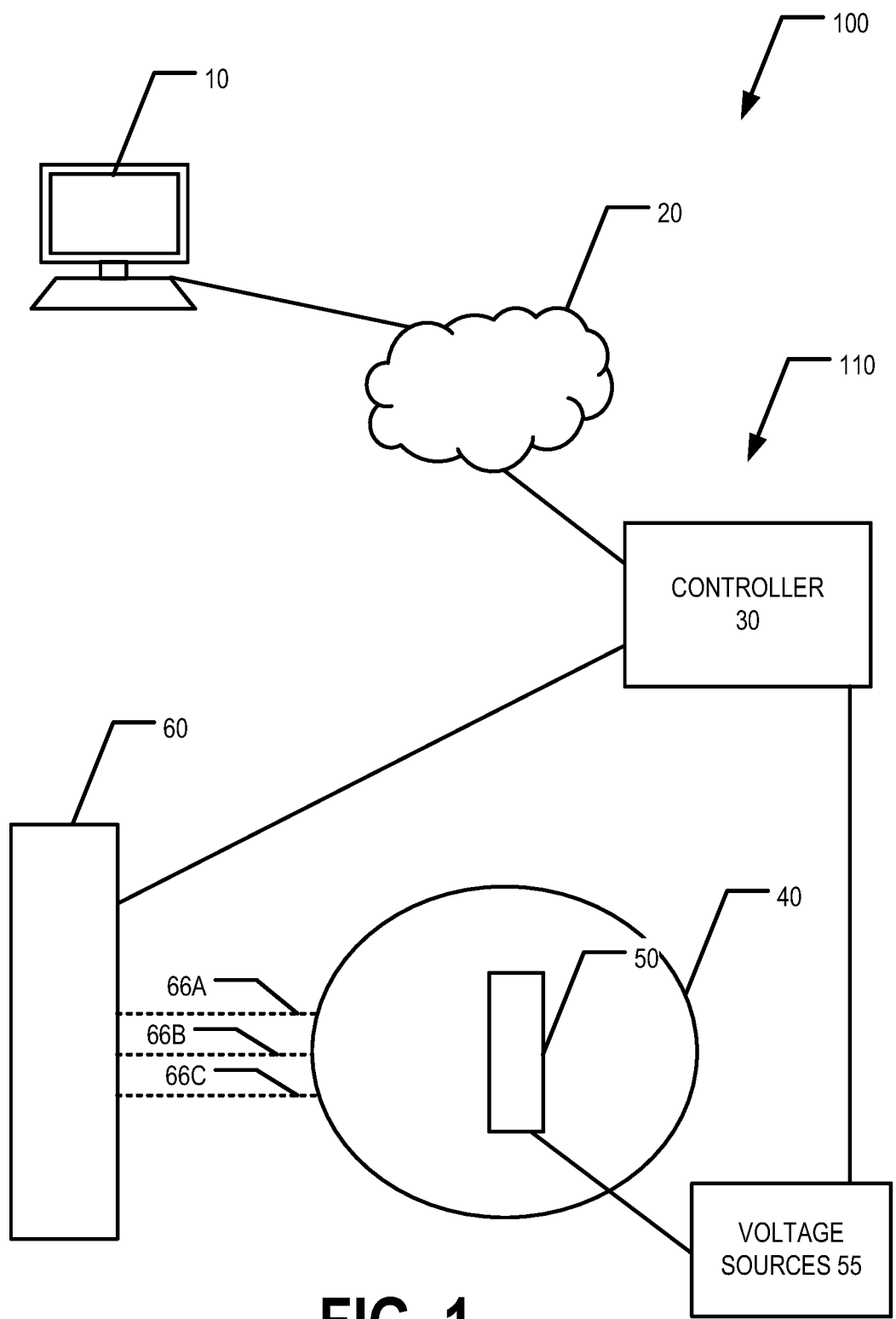

Holz, P.C., et al. Two-Dimensional Linear Trap Arrap for Quantum Information Processing, Sep. 22, 2020, retrieved from the Internet at Cornell University's Archive <https://arxiv.org/pdf/2003.08085.pdf> on Aug. 15, 2022, 26 pages.

Leopold, T, et al., "A cryogenic radio-frequency ion trap for quantum logic spectroscopy of highly charged ions", Review of Scientific Instruments, American Institute of Physics, Jul. 29, 2019, vol. 90, No. 7, retreived from the Internet <https://arxiv.org/pdf/1901.03082.pdf>, 25 pages.

Tabakov, B., et al., "Assembling a ring-shaped crystal in a microfabricated surface ion trap", arxiv.org, Cornell University Library, Jan. 26, 2015 retreived from the Internet <https://arxiv.org/pdf/1501.06554.pdf>, 6 pages.

* cited by examiner

# APPARATUSES, SYSTEMS, AND METHODS FOR ELLIPTICAL ATOMIC OBJECT TRAPS

CROSS-REFERENCE TO RELATED APPLICATIONS

This application claims the benefit of U.S. Provisional Patent Application Ser. No. 63/199,279 filed on Dec. 17, 2020, which is incorporated herein by reference in its entirety, including any figures, tables, drawings, and appendices.

TECHNICAL FIELD

Various embodiments relate to apparatuses, systems, and methods for atomic object traps.

BACKGROUND

An atomic object trap can use electrical fields to capture one or more atomic object in a potential well. Atomic objects can be trapped for a number of purposes, which may include mass spectrometry, research, and/or controlling quantum states thereof, for example. Trapped atomic objects, such as trapped ions, can encode information in their quantum states and act as qubits in quantum computing. Through applied effort, ingenuity, and innovation, many deficiencies of such prior atomic object traps have been solved by developing solutions that are structured in accordance with the embodiments of the present invention, many examples of which are described in detail herein.

BRIEF SUMMARY OF EXAMPLE EMBODIMENTS

Example embodiments provide atomic object traps, atomic object trap apparatuses, systems including atomic trap apparatuses, quantum computers comprising atomic object trap apparatuses, quantum computer systems comprising atomic object trap apparatuses, and/or the like. In various embodiments, the atomic objects are atoms, ions, ion crystals, and/or the like. As used herein, an ion crystal is a group of atoms and/or ions (e.g., an ion pair comprising a qubit atomic object and a sympathetic cooling atomic object). The provided embodiments are optimized to support simultaneous trapping of a relatively large number of atomic objects with a relatively small number of electrical signals. In an example embodiment, an atomic object trap apparatus is substantially elliptically-shaped and has increased compactness and electrical connectivity. For example, the elliptical shape of an atomic object trap apparatus enables laser beams, electrical leads, and/or the like to be shared among different and spatially separated zones and/or electrodes.

According to an aspect of the present disclosure, an atomic object trap apparatus is provided. The atomic object trap apparatus comprises two or more radio frequency (RF) electrodes formed concentrically in a substantially elliptical shape, and three or more trapping and/or transport (TT) electrode sequences formed concentrically each in a substantially elliptical shape. The two or more RF electrodes and the three or more TT electrode sequences define a substantially elliptically-shaped atomic object trap. At least one TT electrode sequence is disposed concentrically between the two or more RF electrodes. Each substantially elliptically-shaped RF electrode and TT electrode sequence comprises two substantially parallel longitudinal regions and two arc-spanning beltway regions. In an example embodiment, each substantially parallel longitudinal region of each of the three or more TT electrode sequences is arranged into a plurality of zones and each arc-spanning beltway region of the at least one TT electrode sequence disposed concentrically between the two or more RF electrodes comprises a plurality of TT electrodes arranged into three or more subgroups of TT electrodes. In an example embodiment, the TT electrodes of each of the three or more subgroups of TT electrodes are in electrical communication with each other. In an example embodiment, the plurality of TT electrodes is arranged such that every $n^{th}$ TT electrode is associated with one subgroup of TT electrodes, wherein n is greater than 1.

In an example embodiment, each subgroup of TT electrodes is configured to be operated independently to at least one of (a) create a plurality of potential wells, or (b) move a potential well. In an example embodiment, creating a plurality of potential wells and moving a potential well are configured to cause at least an atomic object within the defined atomic object trap to be transported from a first longitudinal region of a RF electrode to a second longitudinal region of the RF electrode via one of the two arc-spanning beltway regions. In an example embodiment, the at least an atomic object comprises an ion-crystal. The ion-crystal comprises a qubit atomic object and a sympathetic cooling (SC) atomic object.

In an example embodiment, the plurality of zones comprises a plurality of gating zones and a plurality of auxiliary zones. In an example embodiment, each gating zone is disposed between two auxiliary zones, the gating zone configured for an action to be performed on at least one atomic object within the gating zone (e.g., via application of one or more electromagnetic fields) and the auxiliary zones are configured for stabilizing the at least one atomic object during a transport operation of the at least one atomic object. As used herein, stabilizing the at least one atomic object comprises maintaining the at least one atomic object such that the quantum information/data stored and/or encoded by the qubit atomic object is not disturbed or lost. In an example embodiment, the performed action comprises at least one of (a) a split operation, (b) a combine operation, or (c) a swap operation, the action being caused at least in part by a manipulation source. In an example embodiment, the manipulation source is a laser beam, the laser beam being configured to act as a manipulation source for one or more gating zones. In an example embodiment, each gating zone of the at least one TT electrode sequence disposed concentrically between the two or more RF electrodes comprises at least five TT electrodes. In an example embodiment, each auxiliary zone of the at least one electrode sequence disposed concentrically between the two or more RF electrodes comprises at least three TT electrodes.

In an example embodiment, at least one of the two arc-spanning beltway regions of the at least one TT electrode sequence disposed concentrically between the two or more RF electrodes comprises a load hole configured for loading atomic objects into the ion trap. In an example embodiment, (a) the two or more RF electrodes are disposed between a first TT electrode sequence and a third TT electrode sequence of TT electrodes, (b) the two or more RF electrodes form at least one elliptical gap, and (c) a second TT electrode sequence is disposed within the elliptical gap. In an example embodiment, the ion trap apparatus is part of a trapped atomic object quantum computer.

According to another aspect of the present disclosure, an atomic object trap apparatus is provided. The atomic object trap apparatus comprises a plurality of elliptically-shaped radio frequency (RF) electrodes, and a plurality of elliptically-shaped trapping and/or transport (TT) electrode sequences. The plurality of RF electrodes and the plurality of TT electrode sequences define an ion trap. The defined atomic object trap comprises a longitudinal gating region and two beltway regions. In an example embodiment, the longitudinal gating region is arranged into a plurality of zones and the two beltway regions are configured to be operated so as to cause an atomic object within the atomic object trap to be transported from a first zone of the plurality of zones to a second zone of the plurality of zones. In an example embodiment, each of the two beltway regions comprises a plurality of TT electrodes disposed between the RF electrodes, the plurality of TT electrodes being energized to generate a plurality of electrical potentials.

In an example embodiment, the plurality of TT electrodes are arranged into three or more subgroups of TT electrodes. In an example embodiment, the TT electrodes of each subgroup of TT electrodes are in electrical communication with each other and energized together. In an example embodiment, the plurality of TT electrodes is arranged such that every $n^{th}$ TT electrode is associated with one subgroup of TT electrodes, wherein n is greater than 1. In an example embodiment, each subgroup of TT electrodes is configured to be operated independently to at least one of (a) create a plurality of potential wells, or (b) move a potential well. For example, the generated potential wells may be dynamic. In an example embodiment, creating a plurality of potential wells and moving a potential well are configured to cause at least an atomic object within the defined atomic object trap to be transported from a first longitudinal region of a RF electrode to a second longitudinal region of the RF electrode. In an example embodiment, the at least an atomic object comprises an ion-crystal. The ion-crystal comprises a qubit atomic object and a sympathetic cooling (SC) atomic object.

In an example embodiment, the plurality of zones comprises a plurality of gating zones and a plurality of auxiliary zones. In an example embodiment, each gating zone is disposed between two auxiliary zones, the gating zone configured for an action to be performed on at least one atomic object within the gating zone and the auxiliary zones configured for stabilizing the at least one atomic object during a transport operation of the at least one atomic object. In an example embodiment, the performed action comprises at least one of (a) a split operation, (b) a combine operation, or (c) a swap operation, the action being caused at least in part by a manipulation source. In an example embodiment, the manipulation source is a laser beam. The laser beam is configured to act as a manipulation source for one or more gating zones. In an example embodiment, at least one of the two beltway regions of the defined atomic object trap comprises a load hole configured for loading atomic objects into the atomic object trap. In an example embodiment, the atomic object trap apparatus is part of a trapped atomic object quantum computer.

According to yet another aspect of the present disclosure, a method of operating a quantum computing system comprising an atomic object trap apparatus is provided. The method comprises loading a plurality of atomic objects through a load hole located at an arc-spanning beltway region of a trapping and/or transport (TT) electrode sequence, wherein the TT electrode sequence is substantially elliptically-shaped and disposed between two substantially elliptically-shaped radio frequency (RF) electrodes. Each substantially elliptically-shaped TT electrode sequence and RF electrode comprises two substantially parallel longitudinal regions and two arc-spanning beltway regions. The method further comprises cooling the plurality of atomic objects using a cooling laser beam; detecting an amount of fluorescence emitted by the plurality of atomic objects (e.g., responsive to and/or emitted as part of the cooling of the atomic objects); and transporting the plurality of atomic objects. The transporting generates at least one electrical potential configured to cause loading of a second plurality of atomic objects through the load hole.

According to yet another exemplary embodiment of the present disclosure, an apparatus is provided. The apparatus comprises means for loading a plurality of atomic objects through a load hole located at an arc-spanning beltway region of a trapping and/or transport (TT) electrode sequence, wherein the TT electrode sequence is substantially elliptically-shaped and disposed between two substantially elliptically-shaped radio frequency (RF) electrodes. Each substantially elliptically-shaped TT electrode sequence and RF electrode comprises two substantially parallel longitudinal regions and two arc-spanning beltway regions. The apparatus comprises means for cooling the plurality of atomic objects. The apparatus comprises means for detecting an amount of fluorescence emitted by the plurality of atomic objects as part of the cooling process. The apparatus comprises means for transporting the plurality of atomic objects. The transporting generates at least one electrical potential configured to cause loading of a second plurality of atomic objects through the load hole.

BRIEF DESCRIPTION OF THE SEVERAL VIEWS OF THE DRAWING(S)

Figure 2A:
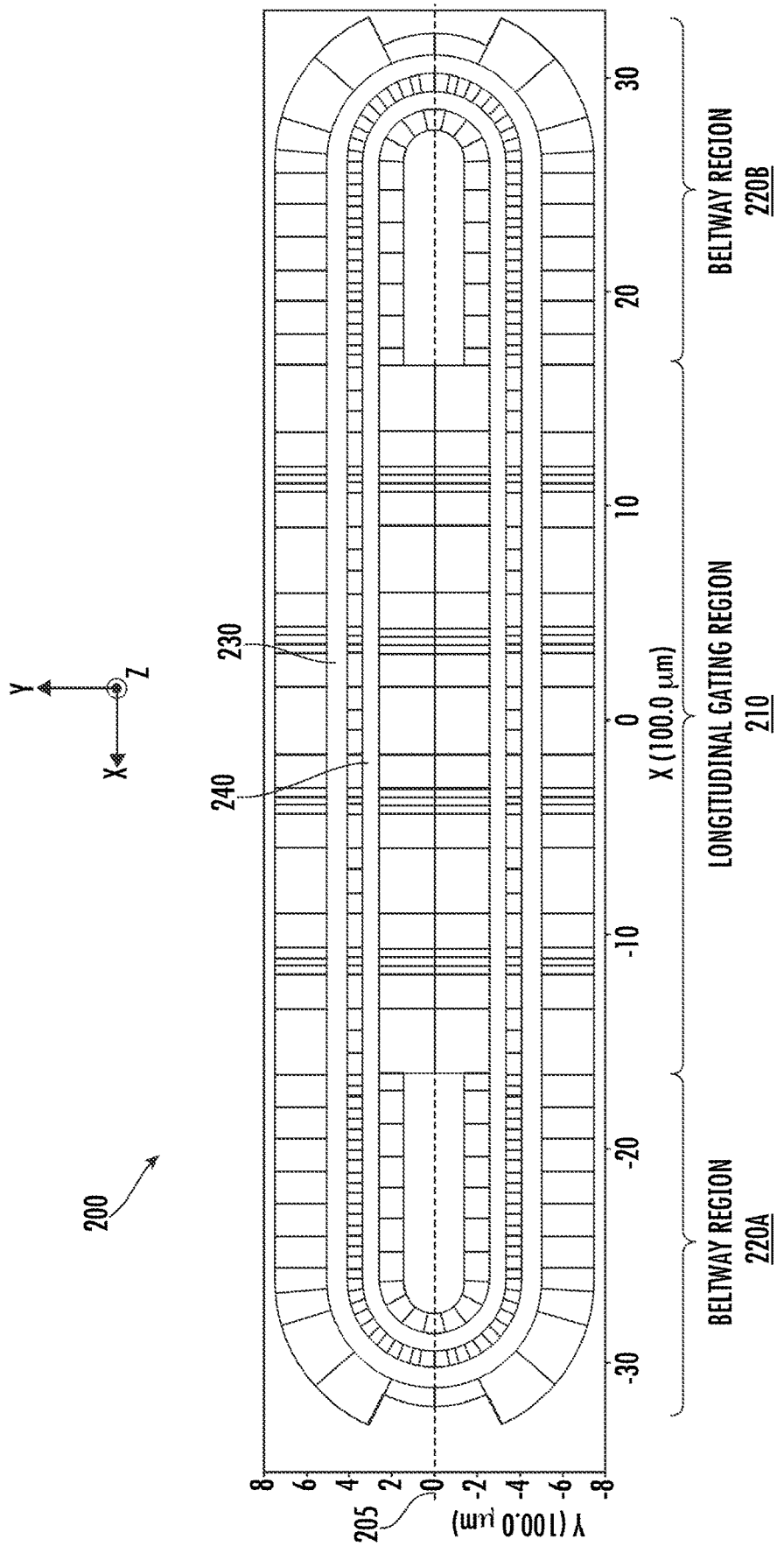
Figure 2B:
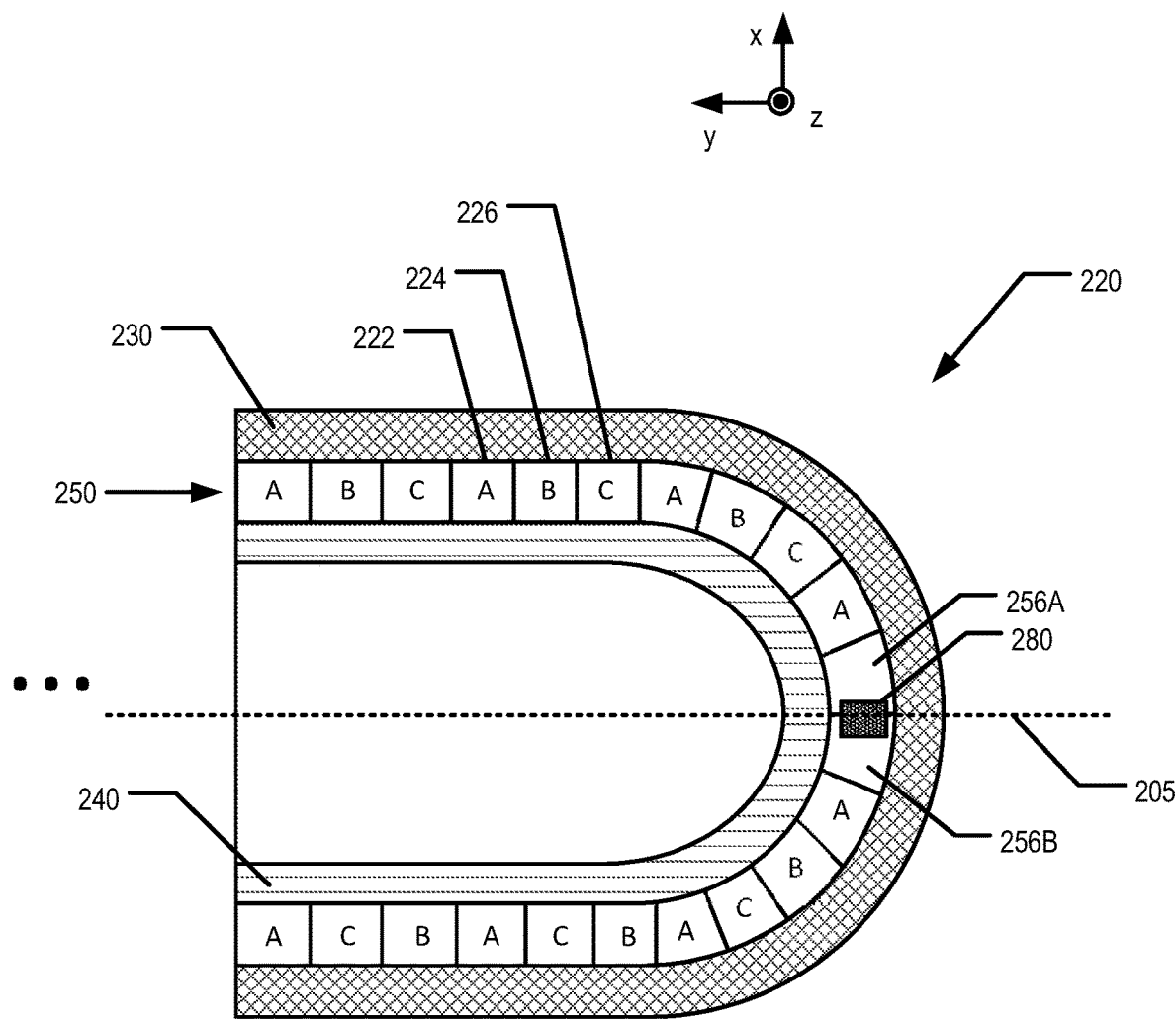
Figure 2C:
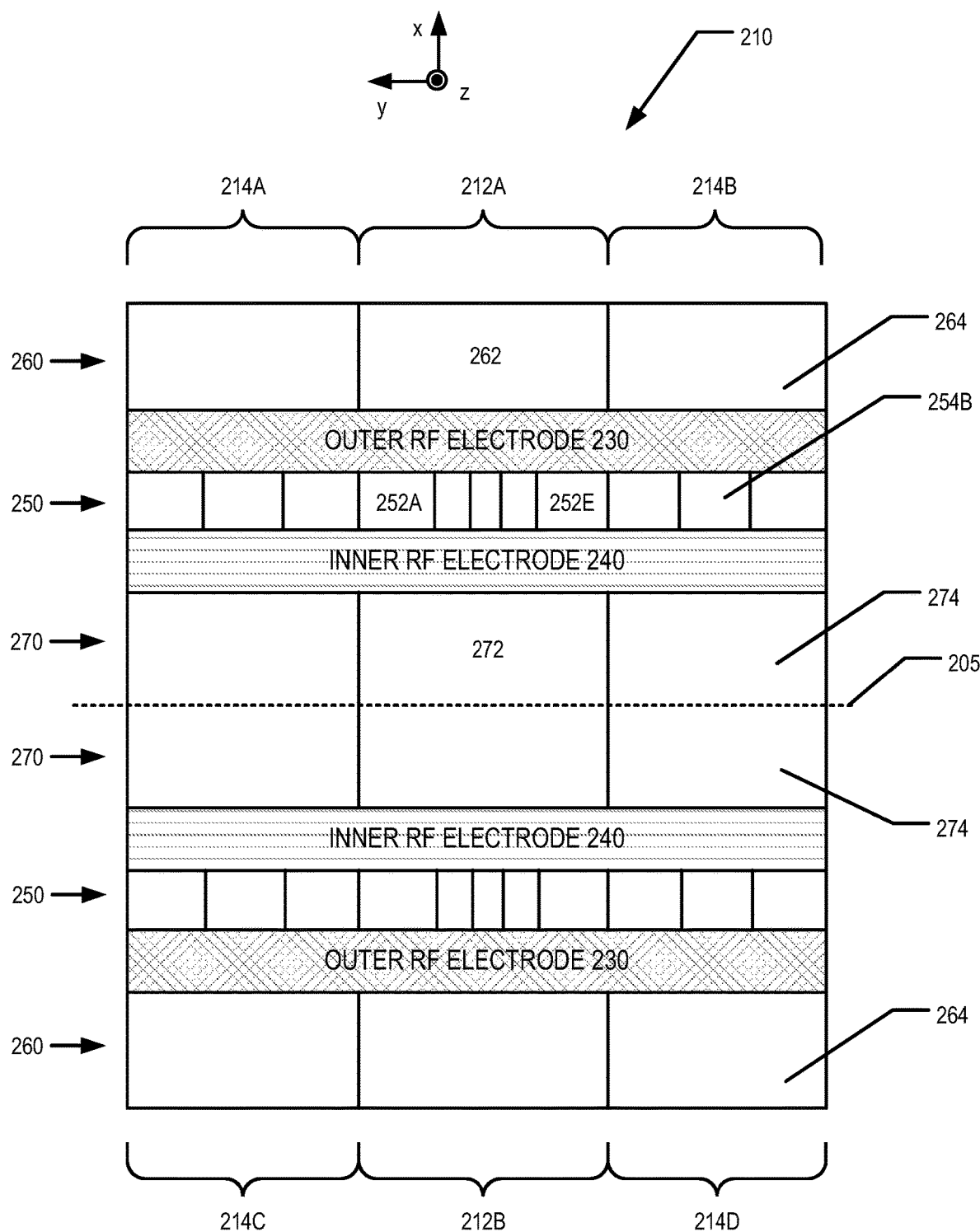
Figure 3:
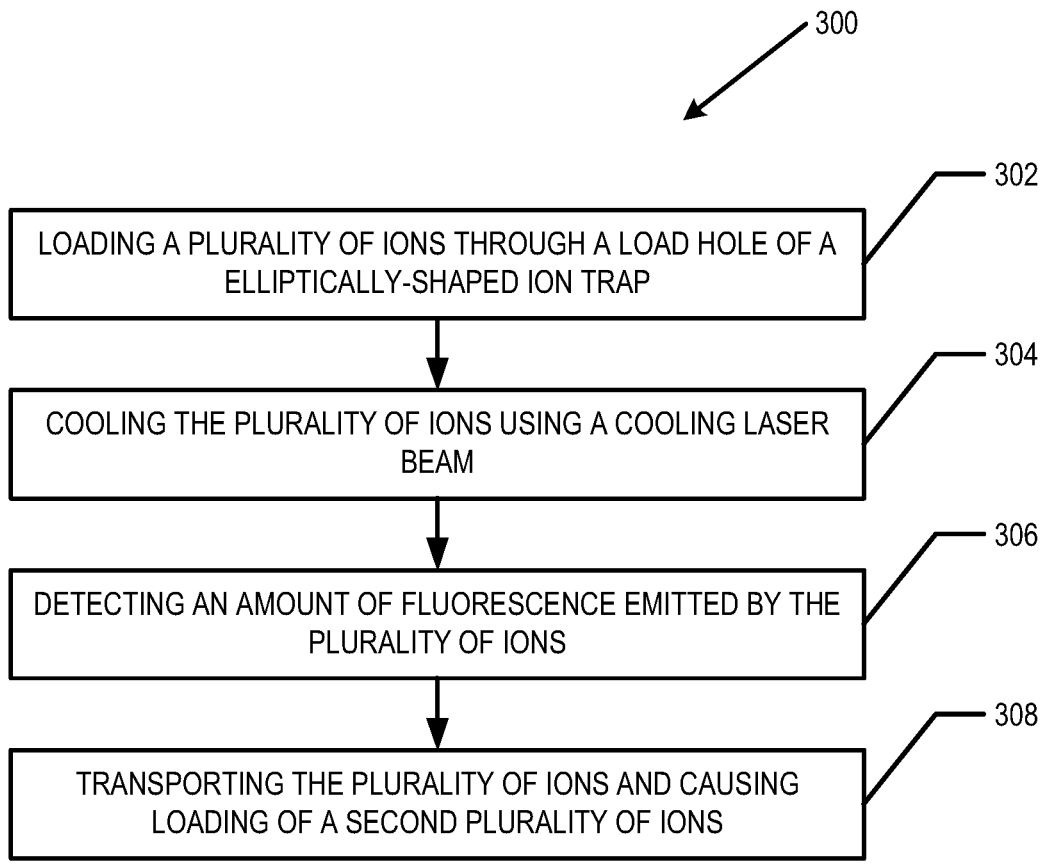
Figure 4:
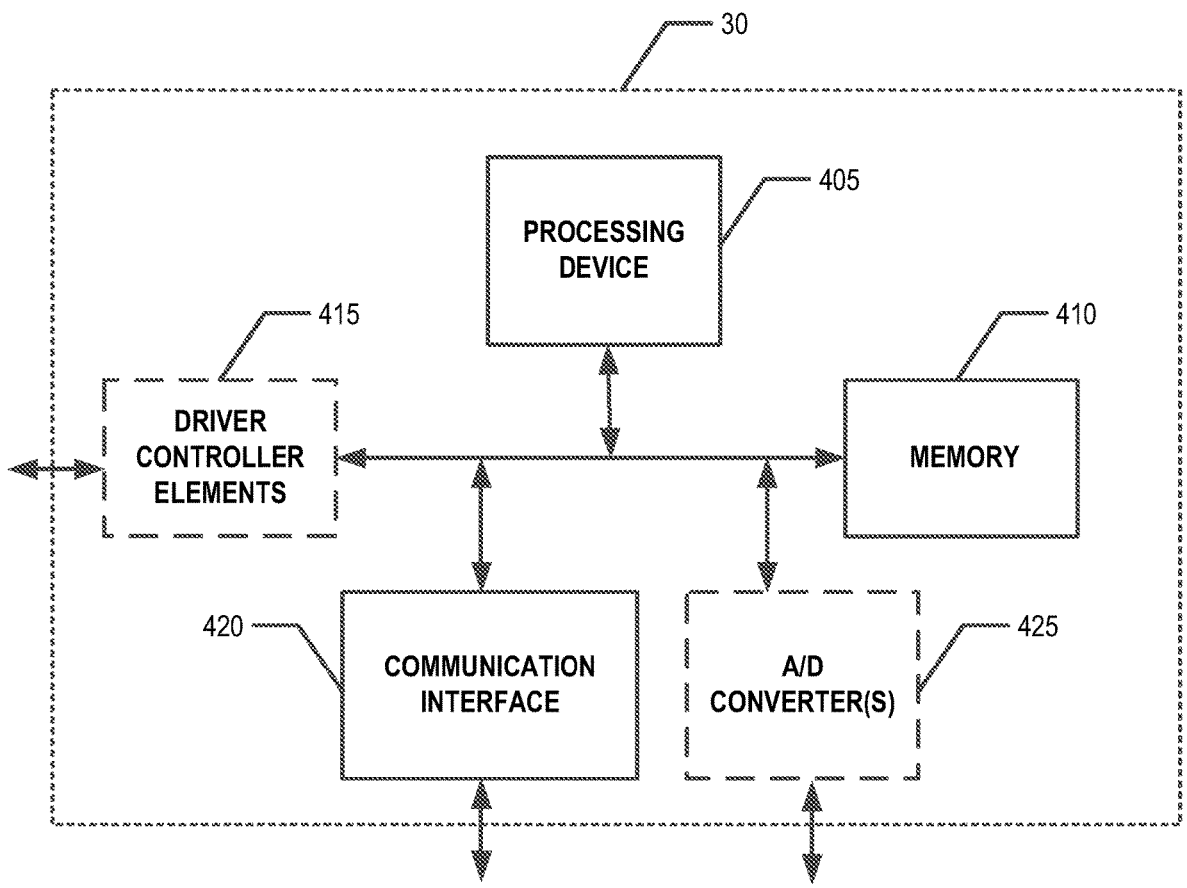
Figure 5:
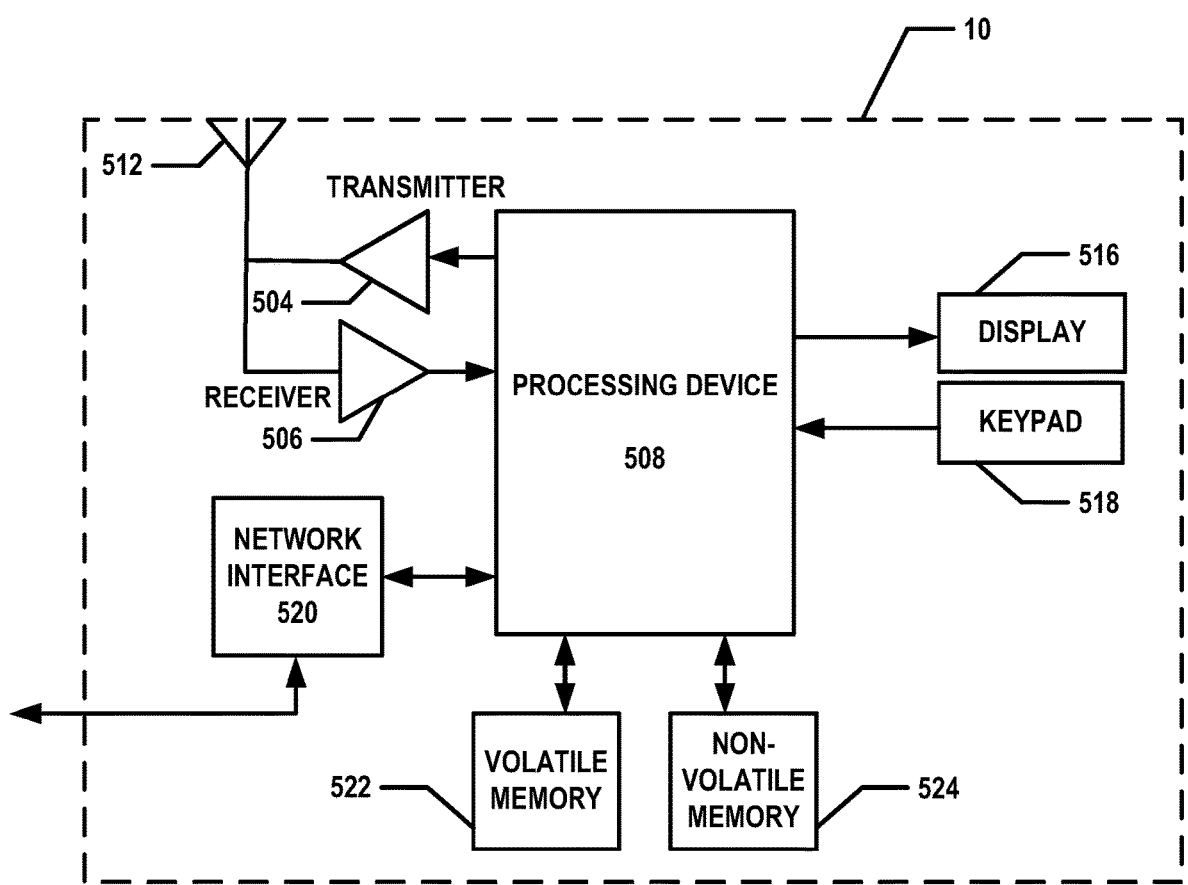

Having thus described the invention in general terms, reference will now be made to the accompanying drawings, which are not necessarily drawn to scale, and wherein:

FIG. 1 provides a schematic diagram of a quantum computer system comprising an atomic object trap apparatus, in accordance with an example embodiment;

FIG. 2A provides a top or plan view of an atomic object trap having an example architecture, in accordance with an example embodiment;

FIG. 2B provides a top or plan view of a portion of an atomic object trap having an example architecture, in accordance with an example embodiment;

FIG. 2C provides a top or plan view of a portion of an atomic object trap having an example architecture, in accordance with an example embodiment;

FIG. 3 is a flowchart illustrating operations performed, in accordance with an example embodiment;

FIG. 4 provides a schematic diagram of an example controller that may be used in accordance with an example embodiment; and FIG. 5 provides a schematic diagram of an example computing entity that may be used in accordance with an example embodiment.

DETAILED DESCRIPTION OF SOME EXAMPLE EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. The terms "generally" and "approximately" refer to within engineering and/or manufacturing limits and/or within user measurement capabilities, unless otherwise indicated. Like numbers refer to like elements throughout.

Exemplary Quantum Computer System

FIG. 1 provides a schematic diagram of an example quantum computer system 100 comprising an atomic object trap apparatus and/or package 50, in accordance with an example embodiment. For example, the atomic object trap apparatus and/or package 50 of the quantum computer system 100 may comprise an elliptical atomic object trap according to the embodiments provided in the present disclosure. In various embodiments, the quantum computer system 100 comprises a computing entity 10 and a quantum computer 110. In various embodiments, the quantum computer 110 comprises a controller 30, a cryostat and/or vacuum chamber 40 enclosing an atomic object trap apparatus and/or package 50, and one or more manipulation sources 60. In an example embodiment, the one or more manipulation sources 60 may comprise one or more lasers (e.g., optical lasers, microwave sources, and/or the like). In various embodiments, the one or more manipulation sources 60 are configured to manipulate and/or cause a controlled quantum state evolution of one or more atomic objects within an atomic object trap of the atomic object trap apparatus and/or package 50. For example, in an example embodiment, wherein the one or more manipulation sources 60 comprise one or more lasers, the lasers may provide one or more laser beams 66 to the atomic object trap of the atomic object trap apparatus and/or package 50 within the cryogenic and/or vacuum chamber 40. In various embodiments, the quantum computer 110 comprises one or more voltage sources 55. For example, the voltage sources 55 may comprise a plurality of voltage drivers and/or voltage sources and/or at least one RF driver and/or voltage source. The voltage sources 55 may be electrically coupled to corresponding electrodes of the atomic object trap apparatus and/or package 50 via corresponding leads.

In various embodiments, a computing entity 10 is configured to allow a user to provide input to the quantum computer 110 (e.g., via a user interface of the computing entity 10) and receive, view, and/or the like output from the quantum computer 110. The computing entity 10 may be in communication with the controller 30 of the quantum computer 110 via one or more wired or wireless networks 20 and/or via direct wired and/or wireless communications. In an example embodiment, the computing entity 10 may translate, configure, format, and/or the like information/data, quantum computing algorithms, and/or the like into a computing language, executable instructions, command sets, and/or the like that the controller 30 can understand, execute, process, and/or implement. Likewise, the computing entity 10 may translate, configure, format, and/or the like information/data, commands, quantum computation results, and/or quantum information provided by the controller 30 into information/data that the computing entity 10 can understand, execute, process, and/or implement.

In various embodiments, the controller 30 is configured to control the voltage sources 55, cryogenic system and/or vacuum system controlling the temperature and pressure within the cryogenic and/or vacuum chamber 40, manipulation sources 60, and/or other systems controlling various environmental conditions (e.g., temperature, pressure, and/or the like) within the cryogenic and/or vacuum chamber 40 and/or configured to manipulate and/or cause a controlled evolution of quantum states of one or more atomic objects within the atomic object trap of the atomic object trap apparatus and/or package 50. In various embodiments, the atomic objects trapped within the atomic object trap of the atomic object trap apparatus and/or package 50 are used as qubits of the quantum computer 110.

In various embodiments, the manipulation sources 60 comprise lasers and laser beams 66A-C delivered to the atomic object trap apparatus and/or package 50. It will be understood that laser beams 66A-C are illustrated for informative purposes and are not limiting as to indicate that the manipulation sources may only comprise three laser beams. In various embodiments, the manipulation sources 60 comprise a plurality of lasers and laser beams. In various embodiments, the manipulation sources 60 are configured to be provided to one or more zones and/or regions of an elliptical atomic object trap of the atomic object trap apparatus and/or package 50. For example, the manipulation sources 60 may comprise a laser beam 66A which may be provided to one zone of the elliptical atomic object trap and another spatially separated zone of the elliptical atomic object trap. Various embodiments described herein provide an elliptical atomic object trap configured and arranged such that laser beams 66 may be efficiently operated to manipulate atomic objects trapped at different spatial regions or zones of the elliptical atomic object trap.

Similarly, the voltage sources 55 may comprise a plurality of voltage drivers and/or voltage sources and/or at least one RF driver and/or voltage source. One or more voltage drivers and/or voltage sources may be configured to operate and/or be connected to more than one electrode of an elliptical atomic object trap of the atomic object trap apparatus and/or package 50. For example, one voltage driver and/or voltage source of the voltage sources 55 may be configured to operate a subgroup of electrodes of the elliptical atomic object trap. As such, various embodiments of the present disclosure provide technical advantages as operation of electrodes of the elliptical atomic object trap requires a reduced number of voltage waveforms or signals.

Exemplary Atomic Object Trap Apparatus

FIG. 2A provides a top or plan view of an elliptical atomic object trap 200 of an atomic object trap apparatus and/or package 50 according to an example embodiment. In various embodiments, the atomic object trap 200 is generally and/or substantially elliptical in shape with the major axis of the ellipse defining a longitudinal axis 205 of the atomic object trap 200. In various embodiments, the elliptical atomic object trap 200 is configured to trap (e.g., via electric fields) a plurality of atomic objects. In various embodiments, atomic objects may be atoms, ions, ion crystals, and/or the like. In various embodiments, an ion crystal is a group of atoms and/or ions comprising and/or consisting of a qubit atom and/or ion and at least one sympathetic cooling (SC) atom and/or ion. In various embodiments, the atomic object trap apparatus and/or package 50 may comprise an atomic object trap chip and/or a substrate on which the elliptical atomic object trap 200 is defined or fabricated. In various embodiments, the elliptical atomic object trap 200 is a surface atomic object trap. For example, the elliptical atomic object trap 200 may be a surface Paul trap. As shown in FIG. 2A, the elliptical atomic object trap 200 is substantially elliptically-shaped. For example, the elliptical atomic object trap 200 comprises a longitudinal gating region 210 and two arc-spanning beltway regions 220A-B, the three regions together forming a substantially elliptical shape. The longitudinal gating region 210 may be longitudinal along a longitudinal axis 205 of the elliptical atomic object trap 200. In various example embodiments, the elliptical atomic object trap 200 may comprise two or more radio frequency (RF) electrodes. For example, the top view of the elliptical atomic object trap 200 provided in FIG. 2A illustrates the elliptical atomic object trap 200 comprising two radio frequency (RF) electrodes formed concentrically in a substantially elliptical shape. Specifically, the elliptical atomic object trap 200 comprises an outer RF electrode 230 and an inner RF electrode 240. In various other embodiments, the elliptical atomic object trap 200 may comprise a plurality of RF electrodes, or more than two RF electrodes. Within the longitudinal gating region 210, the RF electrodes 230, 240 may be substantially parallel to one another and/or to the longitudinal axis 205.

Each RF electrode 230, 240 may be substantially elliptically-shaped. For example, FIG. 2A illustrates the outer RF electrode 230 comprising two substantially parallel longitudinal regions and two arc-spanning beltway regions. Specifically, the two substantially parallel longitudinal regions are located within the longitudinal gating region 210 of the elliptical atomic object trap 200, and each arc-spanning beltway region is located in a beltway region 220A or 220B of the elliptical atomic object trap 200. That is, an arc-spanning beltway region of an RF electrode may refer to a portion of the RF electrode that is located within a beltway region 220 of the elliptical atomic object trap 200, and a substantially parallel longitudinal region of an RF electrode may refer to a portion of the RF electrode that is located within the longitudinal gating region 210 of the elliptical atomic object trap 200. The two substantially parallel longitudinal regions may be substantially parallel to the longitudinal axis 205 of the elliptical atomic object trap 200. The two arc-spanning beltway regions may be substantially transverse and/or intersect the longitudinal axis 205 of the elliptical atomic object trap 200. As will be understood, the two substantially parallel longitudinal regions and the two arc-spanning beltway regions of the outer RF electrode 230 form a complete elliptical loop, thus defining the outer RF electrode 230.

The inner RF electrode 240 may be substantially elliptically-shaped similar to the outer RF electrode 230. For example, the inner RF electrode 240 also comprises two substantially parallel longitudinal regions and two arc-spanning beltway regions. In various example embodiments, the inner RF electrode 240 may be formed concentrically with the outer RF electrode 230. That is, the inner RF electrode 240 does not intersect with the outer RF electrode 230. Because the inner RF electrode 240 may be formed concentrically with the outer RF electrode 230, the two substantially parallel longitudinal regions of the inner RF electrode 240 and the two substantially parallel longitudinal regions of the outer RF electrode 230 may also be parallel to each other and with the longitudinal axis 205 of the elliptical atomic object trap 200. Likewise, the two arc-spanning beltway regions of the inner RF electrode 240 and the two arc-spanning beltway regions of the outer RF electrode 230 may span the same angle and/or exhibit the same degree of concavity such that the inner RF electrode 240 and the outer RF electrode 230 are concentric, and may also be substantially transverse and/or intersect the longitudinal axis 205 of the elliptical atomic object trap 200.

In various example embodiments, the two or more RF electrodes (e.g., the outer and inner RF electrodes 230, 240) may be fabricated above an upper surface of an atomic object trap chip and/or a substrate of an atomic object trap apparatus and/or package 50. In various embodiments, other materials (e.g., dielectrics, insulators, shields, etc.) can be formed between said atomic object trap chip and/or substrate and the two or more RF electrodes (and/or other elliptical atomic object trap 200 components). In various embodiments, the RF electrodes 230, 240 may be fabricated from a conductive material (e.g., copper, silver, gold, and/or the like) or alloys of two or more conductive materials selected as suitable for conduction and/or transmission of an appropriate signal. In various embodiments, the RF electrodes 230, 240 may be fabricated, for example, from copper. In an example embodiment, the cross-sectional area of the RF rails may be determined and/or modified to enable conduction of a current (e.g., from around 0.01 A to around 10.0 A) oscillating at an RF frequency (e.g., from around 3 Hz to 0.3 GHz).

In various embodiments, the radial depth of the outer and inner RF electrodes 230, 240 (e.g., dimension in the x-y plane) and/or thickness of the RF electrodes (e.g., dimension of the RF electrodes in the z-direction) may be varied as suitable for particular applications. In an example embodiment, each RF electrode 230, 240 may be configured to have a radial depth of 80 μm each. In some example embodiments, each RF electrode 230, 240 is configured to have a similar radial depth. In some example embodiments, the RF electrodes 230, 240 are configured to have a radial depth between approximately 50 μm and approximately 150 μm. In some example embodiments, the RF electrodes 230, 240 are configured to have a radial depth between approximately 70 μm and approximately 100 μm. In some example preferred embodiments, the RF electrodes 230, 240 are configured to have a radial depth between approximately 75 μm and approximately 85 μm. The radial depth dimension may be further defined as the dimension of each electrode approximately radial from a center of the elliptical atomic object trap 200. For example, the radial depth dimension may approximately be the y-dimension in the longitudinal gating region 210 and the x-dimension at the ends of the beltway regions 220. Likewise, a circumferential width dimension may be further defined as the dimension normal to the radial depth dimension and substantially along the length of the elliptical shape of the elliptical atomic object trap 200. For example, the circumferential width dimension may substantially be the x-dimension in the longitudinal gating region 210 and the y-dimension at the ends of the beltway regions 220.

In various example embodiments, the outer and inner RF electrodes 230, 240 may be separated (e.g., insulated) from one another by an elliptical gap. In an example embodiment, the elliptical gap separating the outer and inner RF electrodes 230, 240 may be configured to have a radial depth of 80 μm, i.e. there exists at least a radial distance of 80 μm between the two RF electrodes 230, 240. In some example embodiments, the radial depth of the elliptical gap between the RF electrodes 230, 240 is approximately similar to the radial depth of each RF electrode 230, 240. In some example embodiments, the elliptical gap is configured to have a radial depth between approximately 50 μm and approximately 150 μm. In some example embodiments, the elliptical gap is configured to have a radial depth between approximately 70 μm and approximately 100 μm. In some example preferred embodiments, the elliptical gap is configured to have a radial depth between approximately 75 μm and approximately 85 μm. In an example embodiment, the elliptical gap may be at least partially filled with an insulating material (e.g., a dielectric material). In various embodiments, the dielectric material may be silicon dioxide (e.g., formed through thermal oxidation) and/or other dielectric and/or insulating material. In various example embodiments, the arrangement and geometry of the RF electrodes 230, 240 may be configured to generate an elliptical trapping region located about 70 μm above the atomic object trap surface (e.g., in the positive z-direction) and above the elliptical gap between the RF electrodes 230, 240. In some example embodiments, the elliptical trapping region is located between approximately 50 μm and approximately 100 μm above the atomic object trap surface (e.g., in the positive z-direction). In various embodiments, the elliptical trapping region may be a three-dimensional volume above the elliptical atomic object trap 200 within which atomic objects are trapped and/or contained. The elliptical shape of the elliptical trapping region may be defined to coincide with, be an extrusion of, and/or be substantially the same as the elliptical gap between the RF electrodes 230, 240. In various example embodiments, the elliptical atomic object trap 200 may be configured to trap at least one atomic object in a portion of the elliptical trapping region. In various embodiments, RF signals may be applied to the two or more RF electrodes to generate an electric and/or magnetic field that acts to maintain one or more atomic objects trapped within the elliptical trapping region. The electric and/or magnetic field may be generated in directions transverse to the elliptical length of the RF electrodes.

In various example embodiments, the elliptical atomic object trap 200 may comprise three or more substantially elliptically-shaped transport and/or trapping (TT) electrode sequences, with at least one such TT electrode sequence being disposed between the RF electrodes. For example, FIG. 2A illustrates the elliptical atomic object trap 200 comprising three substantially elliptically-shaped transport and/or trapping (TT) electrode sequences: the first TT electrode sequence (also hereinafter referred to interchangeably as the outer TT electrode sequence) being disposed radially outside the outer RF electrode 230, the second TT electrode sequence disposed within the elliptical gap between the RF electrodes 230, 240, and the third TT electrode sequence (also hereinafter referred to interchangeably as the inner TT electrode sequence) disposed radially inside the inner RF electrode 240. In an example embodiment, the elliptical atomic object trap 200 comprises a plurality of TT electrode sequences. Similar to the RF electrodes 230, 240, each TT electrode sequence may be substantially elliptically-shaped. For example, each TT electrode sequence may comprise two substantially parallel longitudinal regions and two arc-spanning beltway regions. The two substantially parallel longitudinal regions of each TT electrode sequence may be located and/or defined within the longitudinal gating region 210 of the elliptical atomic object trap 200, and each arc-spanning beltway region may be located and/or defined within a beltway region 220 of the elliptical atomic object trap 200. Each TT electrode sequence may also be formed to be concentric to the RF electrodes; that is, each of the elliptical atomic object trap 200 components (e.g., the RF electrodes and the TT electrode sequences) may be concentric relative to each other. As such, the longitudinal regions of all the RF electrodes and TT electrode sequences may be parallel with the longitudinal axis 205 of the elliptical atomic object trap 200, and the arc-spanning beltway regions of all the RF electrodes and TT electrode sequences may span the same angle and/or exhibit the same degree of concavity and may be transverse to and/or intersect with the longitudinal axis 205 of the elliptical atomic object trap 200.

In various example embodiments, the upper surface (e.g., in the positive z-direction) of the elliptical atomic object trap 200 may have planarized topology. For example, the upper surface (e.g., in the positive z-direction) of each RF electrode and each TT electrode sequence may be substantially coplanar. In various example embodiments, the upper surface of each RF electrode and each TT electrode sequence may also be substantially coplanar or substantially flush with the upper surface of the atomic object trap apparatus and/or package 50. Likewise, in an example embodiment, the thicknesses (e.g., in the z-direction) of each RF electrode and each TT electrode sequence may be approximately equal. In one example embodiment, the thickness of the RF electrodes 230, 240 and the TT electrodes sequences is in the range of approximately 0.1-20 μm. In a different example embodiment, the thicknesses (e.g., in the z-direction) of the outer and inner TT electrode sequences are greater than the thicknesses of the RF electrodes 230, 240 and the at least one TT electrode sequence disposed between the RF electrodes, which may have substantially the same thickness. In various example embodiments, the three or more TT electrode sequences may have the same or substantially similar radial depth (e.g., dimension in the x-y plane) as the RF electrodes. For example, each TT electrode sequence may be configured to have a radial depth of approximately 80 μm each, of between approximately 50 μm and approximately 150 μm each, of between approximately 70 μm and approximately 100 μm each, of between approximately 75 μm and approximately 85 μm each, and/or the like. In an example embodiment, the at least one TT electrode sequence disposed between the RF electrodes may be configured to have a radial depth equal to or less than the radial depth of the elliptical gap separating the outer and inner RF electrodes 230, 240. For example, the elliptical gap may be configured to have a radial depth of approximately 80 μm and partially filled with insulating material, thereby resulting in the at least one TT electrode sequence disposed within being configured to have a radial depth of less than approximately 80 μm.

In various example embodiments, circumferential gaps may exist between neighboring or adjacent TT electrodes of each TT electrode sequence. In an example embodiment, each circumferential gap may be empty space and/or at least partially filled with a dielectric material to prevent electrical communication between neighboring or adjacent TT electrodes. In an example embodiment, each circumferential gap may be configured to be approximately 1-10 μm. In various example embodiments, each TT electrode sequence and a neighboring or adjacent RF electrode may be electrically insulated from each other to prevent electrical communication. For example, dielectric and/or insulating material may be positioned at locations between a TT electrode sequence and a RF electrode to prevent electrical communication, such dielectric and/or insulating material having a radial depth of approximately 1-10 μm. In various embodiments, TT voltages may be applied to TT electrodes of each TT electrode sequence to maintain and/or cause transport of one or more atomic objects trapped within the elliptical trapping region. For example, the TT voltages in conjunction with the RF signals applied to the two or more RF electrodes may generate an electric and/or magnetic field configured to maintain and/or cause transport of one or more trapped atomic objects.

FIG. 2B illustrates a top or plan view of a portion of an example beltway region 220 of an elliptical atomic object trap, such as the beltway regions 220A-B illustrated in FIG. 2A. As illustrated, FIG. 2B illustrates a right-side (e.g., in the y-direction) beltway region 220, more akin to beltway region 220B illustrated in FIG. 2A. However, a beltway region 220 may be configured the same and/or similarly regardless of which side of an elliptical atomic object trap it is disposed. The architecture illustrated and described in beltway region 220 of FIG. 2B may be applicable to both beltway regions 220A and 220B of FIG. 2A. Generally, each beltway region 220 may be configured to transport atomic objects trapped in the elliptical atomic object trap 200 from one zone to another zone. For example, the elliptical atomic object trap 200 may trap an atomic object in a zone of a first substantially parallel longitudinal region of the elliptical trapping region, and the elliptical atomic object trap 200 may be configured to transport said atomic object through a beltway region 220 to another zone located in a second substantially parallel longitudinal region of the elliptical trapping region. In various example embodiments, a specific beltway region 220 (e.g., either 220A or 220B) may be selected based on the distance over which the atomic object is to be transported. For example, the controller 30 may select beltway region 220B instead of beltway region 220A to transport the atomic object when the atomic object is originally located at and/or is to be transported to a portion located at the right end of the longitudinal gating region 210.

Each beltway region 220 may comprise the arc-spanning beltway regions of the two or more RF electrodes and the arc-spanning beltway regions of the three or more TT electrode sequences. For example, FIG. 2B illustrates the arc-spanning beltway regions of the outer and inner RF electrodes 230, 240 and the arc-spanning beltway region of the second TT electrode sequence 250 disposed between the RF electrodes. As discussed previously, these arc-spanning beltway regions may be concentric (e.g., span the same angle and/or exhibit the same degree of concavity), and the arc-spanning beltway region of the second TT electrode sequence 250 is disposed in the gap between the arc-spanning beltway regions of the outer and inner RF electrodes 230, 240. As described previously, in various example embodiments, the second TT electrode sequence 250 may be at least one TT electrode sequence; that is, at least one TT electrode sequence may be disposed in the gap between the outer RF electrode 230 and the inner RF electrode 240.

The second TT electrode sequence 250 disposed between the RF electrodes comprises a plurality of TT electrodes arranged in a sequence (e.g., along the length of the TT electrode sequence). In various example embodiments, the plurality of TT electrodes of an arc-spanning beltway region of the second TT electrode sequence 250 disposed between the RF electrodes may be arranged into three or more subgroups of TT electrodes. For example, FIG. 2B illustrates the plurality of TT electrodes being arranged into three subgroups of TT electrodes, the subgroups being labelled "A", "B", and "C" for illustrative and non-limiting purposes in FIG. 2B. For example, subgroup A may include the TT electrodes labelled with an "A" such as TT electrode 222; subgroup B may include the TT electrodes labelled with a "B" such as TT electrode 224; subgroup C may include the TT electrodes labelled with a "C" such as TT electrode 226. As demonstrated in FIG. 2B, the plurality of TT electrodes are arranged such that every third electrode belongs to the same subgroup, in some example embodiments. Generally, the plurality of TT electrodes are arranged in an alternating sequence with respect to the subgroups of electrodes. In various example embodiments, the plurality of TT electrodes may be arranged into n subgroups such that every $n^{th}$ electrode belongs to the same subgroup (where n is greater than 1). In an example embodiment, n is at least three, due to at least three energized TT electrodes being required to create and move a single electrical potential well, as understood by those of skill in the field to which the present disclosure pertains.

In various example embodiments, each TT electrode of a subgroup is in electrical communication with the other TT electrodes of the same subgroup. For example, a TT electrode belonging to a particular subgroup (e.g., a TT electrode labelled "A" in FIG. 2B and belonging to the subgroup A) is in electrical communication with each other TT electrode also belonging to the same particular subgroup (e.g., other TT electrodes labelled "A" in FIG. 2B and belonging to subgroup A). In various example embodiments, the TT electrodes belonging to a subgroup are electrically shorted together to enable electrical communication with each other, or within a subgroup. Due to the electrical shorting between the TT electrodes of a subgroup, a subgroup of TT electrodes may be operated by one voltage waveform. For example, a subgroup of TT electrodes may be connected and/or configured to communicate with a voltage driver and/or voltage source of the voltage sources 55 such that the one voltage driver and/or voltage source may operate the subgroup of TT electrodes. Thus, in an example embodiment, the number of voltage sources 55 needed to operate a beltway region may correspond to the number of subgroups. In the illustrated embodiment, for example, the three or more subgroups of TT electrodes in the beltway region 220 illustrated in FIG. 2B may be operated by three or more voltage waveforms. For example, the beltway region 220 illustrated in FIG. 2B may be connected and/or configured to communicate with at least three voltage drivers and/or voltage sources of the voltage sources 55. Specifically, the electrical and/or magnetic field generated at least in part by the voltages applied throughout the three or more subgroups of TT electrodes may trap at least one atomic object in one of the plurality of potential wells above the upper surface of the second TT electrode sequence 250 and/or the elliptical gap between the RF electrodes.

In various embodiments, the subgroups of TT electrodes may be operated to move a plurality of electrical potential wells such as to cause at least one atomic object to be transported from a zone of the elliptical trapping region in the longitudinal gating region 210 to another zone of the elliptical trapping region in the longitudinal gating region 210. In an example embodiment, the subgroups of TT electrodes may be operated to transport the at least one atomic object from a first substantially parallel longitudinal region of the elliptical trapping region (and/or zones thereof) to a second substantially parallel longitudinal region of the elliptical trapping region (and/or zones thereof), the two substantially parallel longitudinal regions being portions of the elliptical trapping region located within the longitudinal gating region 210. As previously described, the elliptical trapping region may be a three-dimensional volume above the elliptical atomic object trap 200 within which atomic objects are trapped and/or contained, and may be located above (e.g., in the positive z-direction) the TT electrode sequence 250 disposed between the RF electrodes. For example, TT voltages may be raised or lowered across the three or more subgroups of TT electrodes to promote transit of at least one atomic object and/or resist further transit of the at least one atomic object.

In various example embodiments, the beltway region 220 may also comprise a load hole 280 configured for loading atomic objects into the elliptical atomic object trap 200. The load hole 280 may be a through hole extending through the elliptical atomic object trap 200 and through the atomic object trap chip and/or substrate on which the elliptical atomic object trap 200 is defined to allow an atomic object source (e.g., an effusive oven) to be disposed below the atomic object trap apparatus and/or package 50 such that an atomic object from the atomic object source may travel through the load hole 280 into the beltway region 220. Once the atomic object enters the beltway region 220 through the load hole 280, the atomic object may be ionized, and the resulting ionized atomic object may become trapped due to the electrical fields and/or corresponding potential generated by the two or more RF electrodes and the three or more TT electrode sequences. In an example embodiment, an atomic object may enter the beltway region 220 via the load hole 280 and be interacted with by one of the manipulation sources 60, which may ionize said atomic object such that the resulting atomic object is trapped within the elliptical atomic object trap 200. In various example embodiments, the beltway region 220 may be configured to receive an atomic object through the load hole 280, stabilize the atomic object within the beltway region 220, enable manipulation of the atomic object via one or more manipulation sources 60 (e.g., to initialize the atomic object and/or ensure the atomic object is in a known, initial quantum state), and/or the like.

In an example embodiment, the loading TT electrodes 256A, 256B are TT electrodes located adjacent to the load hole 280. For example, the load hole 280 may be a through hole that is disposed at least partially within the loading TT electrodes 256A, 256B. In various embodiments, the loading TT electrodes 256A, 256B are independently controlled (e.g., not part of any particular subgroup, such as subgroups A, B, or C). In the example embodiment illustrated in FIG. 2B, the TT electrodes disposed on and/or neighboring either side of the loading TT electrodes 256A, 256B are both assigned to the same subgroup, such that the TT electrodes neighboring the loading TT electrodes 256A, 256B are in electrical communication. However, in various embodiments, the TT electrode disposed on a first side of the loading TT electrodes (e.g., adjacent to or neighboring loading TT electrode 256A) may be assigned to a first subgroup (e.g., subgroup A) and the TT electrode disposed on a second side of the loading TT electrodes (e.g., adjacent to or neighboring loading TT electrode 256B) may be assigned to a different subgroup (e.g., subgroup B or C).

As mentioned above, the beltway region 220 may comprise the arc-spanning beltway regions of the outer TT electrode sequence and the inner TT electrode sequence, the outer TT electrode sequence being disposed radially outward from the outer RF electrode 230 and the inner TT electrode sequence being disposed radially inward from the inner RF electrode 240, as shown generally in FIG. 2A. The outer and the inner TT electrode sequences each comprise a plurality of TT electrodes. In various example embodiments, one TT electrode of the outer TT electrode sequence and one TT electrode of the inner TT electrode sequence may correspond to n TT electrodes of the TT electrode sequence 250 disposed between the RF electrodes, where n is greater than 1. In an example embodiment, n is at least three. Thus, one outer TT electrode and one inner TT electrode may correspond to at least three TT electrodes and may be configured to assist in creating, stabilizing, and moving the single electrical potential well above the at least three TT electrodes. In various other example embodiments, the number of outer TT electrodes and the number of inner TT electrodes that correspond to n TT electrodes may be adjusted based on the curvature of the electrodes. For example, the inner circumferential width (e.g., dimension in the x-y plane) of each TT electrode of the second TT electrode sequence 250 is less than the outer circumferential width of each TT electrode due to the curved geometry, thus the number of outer TT electrodes corresponding to at least three TT electrodes may be higher than the number of inner TT electrodes. In an example embodiment, the outer and inner TT electrode sequences may be operated independently of the second TT electrode sequence 250 disposed between the RF electrodes 230, 240. Specifically, the outer and inner TT electrodes may be operated by voltage waveforms different and/or independent from the three or more voltage waveforms operating the three or more subgroups of TT electrodes disposed between the RF electrodes 230, 240.

The dimensions of each outer TT electrode and inner TT electrode may be adjusted such that one outer and one inner TT electrode correspond to at least three TT electrodes of the second TT electrode sequence 250. Returning to FIG. 2A, the two outer TT electrodes at the end of each beltway region (e.g., two outer TT electrodes at each end of the longitudinal axis 205 of the elliptical atomic object trap 200) may also be configured to have a reduced radial depth. The width of these outer TT electrodes at least at the end of each beltway region may be reduced as illustrated to reduce interference with electrical signals being conducted through the outer and inner RF electrodes 230, 240 and/or electrical leads (e.g., in electrical communication with the RF electrodes 230, 240, and/or one or more TT electrodes) that extend under the RF and/or TT electrodes of the elliptical atomic object trap 200 (e.g., at the ends of the elliptical atomic object trap 200). For example, in some embodiments, the effect of the electric fields generated by the RF electrodes 230, 240 may extend underneath the elliptical atomic object trap 200, and a reduction of the radial dimension of these outer TT electrodes by a configurable amount may prevent and/or reduce such effect underneath the elliptical atomic object trap 200. In various example embodiments, the dimensions of the outer and inner TT electrodes may be determined and/or modified in order to enable electrical potentials to be generated above the corresponding at least three TT electrodes of the second TT electrode sequence 250.

Continuing to FIG. 2C, an example portion of a longitudinal gating region 210 of an elliptical atomic object trap 200 is illustrated. The longitudinal gating region 210 may comprise the substantially parallel longitudinal regions of the two or more RF electrodes and the substantially parallel longitudinal regions of the three or more TT electrode sequences. For example, the substantially parallel longitudinal regions of RF electrodes 230, 240 and the TT electrode sequences 250, 260, 270 are illustrated in FIG. 2C. It will be understood that FIG. 2C only provides a portion of a longitudinal gating region 210 and not a longitudinal gating region 210 in its entirety such as is shown in FIG. 2A. In an example embodiment, the longitudinal gating region 210 may be substantially similar to, comprise of, and/or the same as a longitudinal ion trap, such as those described in co-pending U.S. patent application Ser. No. 16/717,602, the contents of which are herein incorporated by reference.

In various example embodiments, the longitudinal gating region 210 may be arranged into a plurality of zones. Therefore, each substantially parallel longitudinal region of the three TT electrode sequences 250, 260, 270 may also be arranged into a plurality of zones. For example, FIG. 2C illustrates the portion of the longitudinal gating region 210 being arranged into three zones 214A, 212A, 214B in the upper half and three zones 214C, 212B, 214D in the lower half. To be clear, the upper half of the longitudinal gating region 210 may generally refer to portions of the RF electrodes and TT electrode sequences positioned in a positive x-direction relative to the longitudinal axis 205 of the elliptical atomic object trap 200, while the lower half of the longitudinal gating region 210 may generally refer to portions of the RF electrodes and TT electrode sequences positioned in a negative x-direction relative to the longitudinal axis 205 of the elliptical atomic object trap 200. Each zone may comprise a portion of each of the two or more RF electrodes and the three or more TT electrode sequences. Each zone may also comprise a portion of the elliptical trapping region. As mentioned previously, the elliptical trapping region may be a three-dimensional volume above the elliptical atomic object trap 200 within which atomic objects are trapped and/or contained, and may be specifically located above the at least one TT electrode sequence disposed between the RF electrodes. Thus, an atomic object trapped in a portion of the elliptical trapping region above the portion of the second TT electrode sequence 250 in zone 212A may be considered simply to be trapped in zone 212A.

In various example embodiments, the plurality of zones may comprise a plurality of gating zones and a plurality of auxiliary zones. For example, zones 212A, 212B may be gating zones, and zones 214A, 214B, 214C, 214D may be auxiliary zones. In various example embodiments, each gating zone may be disposed between two auxiliary zones. In other words, an atomic object may enter an auxiliary zone 214 immediately when being transported out of a gating zone 212 and prior to entering any other gating zone 212. In various example embodiments, each gating zone 212 may comprise a number of electrodes of the second TT electrode sequence 250 disposed between the RF electrodes. In an example embodiment, each gating zone 212 comprises five electrodes of the second TT electrode sequence 250 disposed between the RF electrodes. For example, a gating zone 212 may comprise TT electrodes 252A-E, as shown in FIG. 2C (TT electrodes 252B, 252C, 252D not explicitly labelled to reduce visual clutter of the drawing). In various example embodiments, TT electrodes 252A-E may be individually controllable. For example, each TT electrode 252A-E may be connected to and/or configured to be in electrical communication with a different voltage driver and/or voltage source of the voltage sources 55. Thus, it is clear that the TT electrodes of the second TT electrode sequence 250 in the longitudinal gating region 210 differ from the TT electrodes of the second TT electrode sequence 250 in the arc-spanning beltway regions 220 because the TT electrodes in the longitudinal gating region may not be arranged into subgroups and may be individually controllable. In various example embodiments, TT electrodes 252A-E may each have different circumferential widths. For example, TT electrodes 252A, 252E may be wide-matched electrodes, whereas TT electrodes 252B, 252C, 252D may be narrow-matched electrodes.

In various example embodiments, each gating zone 212 may comprise a number of outer gating electrodes 262 of the outer TT electrode sequence 260 and a number of inner gating electrodes 272 of the inner TT electrode sequence 270. For example, gating zone 212A of the outer TT electrode sequence 260 may comprise at least five TT electrodes, and gating zone 212A of the inner TT electrode sequence 260 may comprise at least five TT electrodes as well (e.g., outer gating electrode 262 as illustrated may be outer gating electrodes 262A-262E). As a result, each gating zone 212 may comprise fifteen TT electrodes from the three or more TT electrode sequences. In various example embodiments, the number of gating electrodes 262, 272 from the outer and inner TT electrode sequences 260, 270 belonging to a gating zone 212 may be determined, configured, and/or modified based at least in part on an action to be performed on an atomic object within the gating zone 212 or a level of control needed over the electrical potential in the gating zone 212. In various embodiments, the electrodes within a gating zone 212 may be individually controllable. For example, each outer electrode 262, inner electrode 272, and electrode 252 disposed between the RF electrodes 230, 240 may be operated by a different voltage driver and/or voltage source of the voltage sources 55.

In various example embodiments, each gating zone 212 may be configured for an action to be performed on at least one atomic object within each gating zone 212A. For example, the elliptical atomic object trap 200 may be configured to trap at least one atomic object in a portion of an elliptical trapping region within gating zone 212A, where gating zone 212A may be configured to perform a specific action on the at least one atomic object. Example actions may include split operations (e.g., dividing two atomic objects that were in the same potential well into two distinct and/or separate potential wells), combine operations (e.g., bringing two atomic objects into the same potential well), swap operations (e.g., switching the relative positions of two or more atomic objects within the atomic object trap), and/or other functions that may enable the controlled evolution of a quantum state of at least one atomic object trapped within the elliptical atomic object trap 200 and/or the arbitrary rearrangement of one or more trapped atomic objects. For example, the ability to arbitrarily arrange one or more trapped atomic objects allows for arbitrary pairs of atomic objects to be placed in each gating zone 212, which allows for quantum gate operations to be performed. Following the execution of such quantum gate operations, the atomic objects may be arbitrarily rearranged and transported out of a gating zone 212 to facilitate another operation to be performed in the same gating zone 212.

The various actions that may be performed within gating zones 212 may be caused by a manipulation source of the manipulation sources 60. In various example embodiments, one manipulation source of the manipulation sources 60 may be configured to cause actions in different gating zones 212. For example, a manipulation source such as laser beam 66B may be configured to cause an action to be performed in gating zone 212A and another action to be performed in gating zone 212B, due to the relative proximity of the two zones. In another example, a manipulation source may be configured to cause actions to be performed in two gating zones that are more spatially separated (e.g., on different ends of the longitudinal gating region 210). In various example embodiments, a number of manipulation sources are required to cool one or more trapped atomic objects in a gating zone 212 to near their motional ground state before quantum gate operations may be performed on the one or more trapped atomic objects. In an example embodiment, the manipulation sources used to cool the one or more trapped atomic objects may be different than the manipulation sources used to cause the execution of quantum gate operations. Even further, another number of manipulation sources may be used to generate state-dependent fluorescence from the trapped atomic objects after quantum gate operations have been performed. In an example embodiment, the manipulation sources used to generate state-dependent fluorescence may be different than the manipulation sources used to cause the execution of quantum gate operations and the manipulation sources used to cool the one or more trapped atomic objects.

In various example embodiments, each auxiliary zone 214 may comprise a number of electrodes of the second TT electrode sequence 250 disposed between the RF electrodes. In an example embodiment, each auxiliary zone 214 comprises three electrodes of the TT electrode sequence 250 disposed between the RF electrodes. For example, an auxiliary zone 214 may comprise TT electrodes 254A-C, as shown in FIG. 2C (TT electrodes 254A, 254C not explicitly labelled In FIG. 2C). In various example embodiments, TT electrodes 254A and 254C may be wide-matched electrodes, whereas TT electrode 254B may be a narrow-matched electrode. Each auxiliary zone 214 may also comprise a number of outer auxiliary electrodes 264 of the outer TT electrode sequence 260 and a number of inner auxiliary electrodes 274 of the inner TT electrode sequence 270. For example, auxiliary zone 214A may comprise one outer auxiliary electrode 264 from the outer TT electrode sequence 260 and one inner auxiliary electrode 274 from the inner TT electrode sequence 270. As a result, each auxiliary zone may comprise five TT electrodes from the three or more TT electrode sequences. Each TT electrode within an auxiliary zone 214 may be individually controllable. For example, each of TT electrodes 254A-C, outer auxiliary electrode 264, and inner auxiliary electrode 274 of an auxiliary zone 214 may be connected to and/or configured to be in electrical communication with a different voltage driver and/or voltage source of the voltage sources 55.

In various example embodiments, each auxiliary zone 214 may be configured for stabilizing and/or storing an atomic object therein, separating at least one atomic object from a potential well having multiple atomic objects therein into a different potential well, and for transporting the atomic object therethrough. In various example embodiments, an auxiliary zone 214 may be configured and/or designed to accommodate storage and/or stabilization of one or more atomic objects during various atomic object transport steps.

In each gating zone 212 or auxiliary zone 214, electrical fields generated as a result of voltages applied to the various TT electrodes within each zone may trap at least one atomic object in a potential well above the upper surface of each zone. Furthermore, these electrical fields may be manipulated by controlling the applied voltages to then promote transit of the at least one atomic object to another zone or resist further transit of the at least one atomic object. To further contribute to controlling transit between the various zones and/or stabilizing the at least one atomic object trapped in a particular zone, the elliptical atomic object trap 200 may be operated within a cryogenic and/or vacuum chamber capable of cooling the atomic object trap to a temperature of less than 124 Kelvin (e.g., less than 100 Kelvin, less than 50 Kelvin, less than 10 Kelvin, less than 5 Kelvin, and/or the like), in various embodiments.

Various embodiments of an elliptical atomic object trap 200 may comprise more or fewer gating zones 212, and a corresponding greater or lesser number of auxiliary zones 214 than illustrated in FIGS. 2A-2C. A variety of number of gating zones 212 and/or auxiliary zones 214 and various arrangements thereof may be used in various embodiments, as appropriate for the application. For example, returning to the example embodiment illustrated in FIG. 2A, the elliptical atomic object trap 200 comprises eight gating zones 212 and ten auxiliary zones 214.

Exemplary Operation

FIG. 3 illustrates an example method 300 for operating a quantum computer system comprising an atomic object trap apparatus and/or package. For example, the method 300 may be performed to operate the quantum computer system 100 comprising the atomic object trap apparatus and/or package 50. Specifically, the atomic object trap apparatus and/or package 50 may comprise an elliptical atomic object trap according to the example embodiments provided in the present disclosure, such as elliptical atomic object trap 200 illustrated in FIGS. 2A-D. In various embodiments, the quantum computer system 100 may comprise means for executing and/or performing the method 300. For example, the method 300 may be executed at least in part by the controller 30 and/or the computing entity 10.

Starting at block 302, a plurality of atomic objects may be loaded through a load hole of an atomic object trap. The load hole may be located at an arc-spanning beltway region of a trapping and/or transport (TT) electrode sequence, such as the arc-spanning beltway region of the second TT electrode sequence 250 illustrated in FIG. 2B. That is, the TT electrode sequence may be substantially elliptically-shaped and disposed between two substantially elliptically-shaped radio frequency (RF) electrodes, wherein each substantially elliptically-shaped TT electrode sequence and RF electrode comprises two substantially parallel longitudinal regions and two arc-spanning beltway regions. For example, the load hole 280 illustrated in FIG. 2B may be an example of a load hole through which a plurality of atomic objects are loaded at block 302.

In various embodiments, the load hole 280 may be defined in a location in the elliptical atomic object trap 200 that minimizes perturbance of atomic objects trapped in the longitudinal gating region 210 or beltway region 220 (e.g., during a loading operation). For example, the load hole 280 may be defined at the end of the beltway region 220 as illustrated in FIG. 2B to minimize perturbance of atomic objects trapped in the longitudinal gating region 210. In various example embodiments, the elliptical atomic object trap 200 may comprise one or more load holes 280, and a load hole 280 may be selected for loading a plurality of atomic objects based on a relative distance away from the trapped atomic objects within the elliptical atomic object trap 200. After loading of the plurality of atomic objects, the plurality of atomic objects may be trapped within the elliptical trapping region located above the elliptical atomic object trap 200. Specifically, the plurality of atomic objects may be trapped in a portion of the elliptical trapping region located above the load hole 280 through which the plurality was loaded.

In various example embodiments, loading a plurality of atomic objects through a load hole may comprise the use of an effusive oven which may provide atomic flux through the load hole. For example, the effusive oven may be a part of the atomic object trap apparatus and/or package 50 and/or the quantum computing system 100. The effusive oven may be operated to a specific temperature and/or temperature range configured to provide a pre-determined amount of atomic flux through the load hole. In various other embodiments, the quantum computing system 100 and/or the atomic object trap apparatus and/or package 50 may comprise means for providing atomic flux through the load hole. In various example embodiments, loading a plurality of atomic objects through a load hole 280 further comprises the use of a photo-ionization laser above the load hole to convert the provided atomic flux into ionized atomic objects. For example, the photo-ionization laser may be a part of the atomic object trap apparatus and/or package 50 and/or the quantum computing system 100. In various embodiments, the quantum computing system 100 and/or the atomic object trap apparatus and/or package 50 may comprise various means for converting the neutral atomic flux into ionized atomic objects. The provided atomic flux may be electrically neutral. In various example embodiments, the photo-ionization laser may be one of the manipulation sources 60.

Returning to FIG. 3 at block 304, the plurality of atomic objects may be cooled using a cooling laser beam. For example, the quantum computing system 100 and/or atomic object trap apparatus and/or package 50 may comprise a cooling laser beam or means for cooling a plurality of atomic objects. In various example embodiments, the cooling laser beam may be configured to be operated at a specific frequency, wavelength, temperature and/or the like to cool the plurality of atomic objects to a specific pre-determined temperature, temperature range, kinetic energy, kinetic energy range, and/or the like. For example, the controller 30 may operate the cooling laser beam with determined parameters to cool the plurality of atomic objects to a specific pre-determined temperature, temperature range, kinetic energy, kinetic energy range, and/or the like. In various example embodiments, the cooling laser beam may be one of the manipulation sources 60. For example, the plurality of atomic objects may be cooled sufficiently that the atomic objects may be captured, maintained, and/or the like within one or more potential wells generated by the RF and/or TT electrodes of the atomic object trap. In various example embodiments, the cooling laser beam may specifically be a Doppler cooling laser beam. In an example embodiment, the interaction of a cooling laser beam with an atomic object may cause the atomic object to cool by fluorescing and/or luminescing (e.g., emitting one or more photons).

At block 306, an amount of fluorescence emitted by the plurality of atomic objects may be detected. The amount of fluorescence may be emitted as a result of the cooling of the plurality of atomic objects (see block 304). Specifically, the amount of fluorescence emitted may be dependent on one or more of a number of atomic objects cooled, the resulting temperature and/or kinetic energy of the plurality of atomic objects, the starting temperature and/or kinetic energy (before cooling) of the plurality of atomic objects, and various parameters of the cooling laser beam or means used to cool the plurality of atomic objects. In various example embodiments, the quantum computing system 100 and/or the atomic object trap apparatus and/or package 50 may comprise means, such as a photo-detector (e.g., photodiode, photon multiplier tube, and/or the like), for detecting the amount of fluorescence emitted by the plurality of atomic objects. In an example embodiment, the controller 30 may be configured to operate such means, such as a photo-detector, and/or receive a signal therefrom and control some components and/or parameters such as an aperture or image filters. In various example embodiments, the fluorescence emitted by the plurality of atomic objects may specifically be Doppler fluorescence.

At block 308, the plurality of atomic objects may be transported, from one portion of the elliptical trapping region to another portion of the elliptical trapping region. Before the execution of block 308, the plurality of atomic objects may be trapped and/or contained in a portion of the elliptical trapping region substantially above and/or corresponding to the load hole 280. In order for the plurality of atomic objects to be transported to a different portion of the elliptical trapping region, the elliptical atomic object trap 200 may (e.g., by a controller 30) raise or lower TT voltages across the three or more subgroups of TT electrodes to promote transit of the plurality of atomic objects. For example, raising, lowering, or otherwise modifying voltage waveforms provided to the TT electrodes of the beltway region may move a plurality of potential wells within which the plurality of atomic objects are trapped and/or contained.

Transporting the plurality of atomic objects may cause at least one electrical potential to be generated that is configured to cause loading of a second plurality of atomic objects through the load hole. In various example embodiments, the transporting may depend on the detection of an appropriate amount of fluorescence at block 306. For instance, block 308 may not begin or execute until a pre-determined threshold of fluorescence is detected; that is, block 306 may repeat indefinitely until such a threshold criteria is met and/or satisfied. In some embodiments, the method 300 may terminate if the pre-determined threshold of fluorescence is not detected for a pre-determined amount of time.

The plurality of atomic objects may be transported from a portion of the arc-spanning beltway region of the second TT electrode sequence to another portion of the arc-spanning beltway region of the second TT electrode sequence. To be precise, the plurality of atomic objects may be located above (e.g., in the positive z-direction) the second TT electrode sequence 250 in the elliptical trapping region (as described above in the context of FIGS. 2A-D), and may be transported from a location above one portion of the second TT electrode sequence 250 to another location above another portion of the second TT electrode sequence 250. In various example embodiments, a portion of the TT electrode sequence over which a plurality of atomic objects may be trapped and transported to/from may be defined by n or more TT electrodes, where n is greater than 1. In an example embodiment, n is at least three. For example, as described in context of FIG. 2B, the TT electrodes of the TT electrode sequence 250 may each belong to different subgroups, thereby allowing the creation and movement of a plurality of electrical potential wells. Thus, the plurality of atomic objects may be transported by operation of the TT electrodes of the TT electrode sequence 250, or more specifically, operation of each subgroup of TT electrodes. In various example embodiments, the arc-spanning beltway region operates like a "conveyor belt," such that the plurality of atomic objects may be transported to a neighboring portion, each portion defined by n or more TT electrodes. In various example embodiments, the plurality of atomic objects may be transported from the arc-spanning beltway region directly to a zone within the longitudinal gating region 210 of the elliptical atomic object trap 200.

In various example embodiments, the transporting of the plurality of atomic objects automatically and/or inherently creates a new electrical potential above the load hole, causing and/or allowing loading of a second plurality of atomic objects through the load hole. In various example embodiments, the method 300 may be repeated for a number of times because the transporting of the plurality of atomic objects automatically may cause the loading of a second plurality of atomic objects. The method 300 may be repeated until the desired number of atomic objects are loaded into the elliptical atomic object trap. In various example embodiments, the second plurality of atomic objects may be a different species than the first plurality of atomic objects loaded at block 302. For example, different atomic object species may be loaded to enable sympathetic laser cooling of some atomic objects trapped in the longitudinal gating region 210.

Technical Advantages

Various embodiments provide technical solutions to the technical problem of providing an atomic object trap apparatus that provides sufficient atomic object location control, enables various atomic object transport functions (e.g., transport atomic objects, separating two or more atomic objects within one potential well into different potential wells, swapping and/or separating two atomic objects (e.g., dividing two atomic objects that were in the same potential well into two distinct and/or separate potential wells) and/or the like), and enables manipulation of atomic objects within the atomic object trap via manipulation sources, while at the same time minimizing physical space on a chip and minimizing the amount of voltage waveforms (e.g., electrical leads) required to operate such an atomic object trap apparatus. The novel elliptical atomic object trap architecture enables a relatively large number of trap zones (e.g., to thereby provide more qubits for a quantum computer system) with a relatively small number of electrical signals needed for operation and a relatively small physical area needed on an atomic object trap chip. The large number of trap zones enable the simultaneous trapping of a large number of atomic objects, thereby providing a quantum computing system with a large number of qubits. FIG. 2A illustrates an example architecture capable of simultaneously trapping over 50 separate atomic objects. The presently described elliptical atomic object trap architecture is further enabled for improved micro-fabrication as compared to micro-fabrication of prior atomic object traps.

Exemplary Controller

In various embodiments, an atomic object trap apparatus and/or package 50 is incorporated into a quantum computer 110. In various embodiments, a quantum computer 110 further comprises a controller 30 configured to control various elements of the quantum computer 110. For example, the controller 30 may be configured to control the voltage sources 55, a cryogenic system and/or vacuum system controlling the temperature and pressure within the cryogenic and/or vacuum chamber 40, manipulation sources 60, and/or other systems controlling the environmental conditions (e.g., temperature, humidity, pressure, and/or the like) within the cryogenic and/or vacuum chamber 40 and/or configured to manipulate and/or cause a controlled evolution of quantum states of one or more atomic objects within an elliptical atomic object trap of the atomic object trap apparatus and/or package 50.

As shown in FIG. 4, in various embodiments, the controller 30 may comprise various controller elements including processing elements 405, memory 410, driver controller elements 415, a communication interface 420, analog-digital converter elements 425, and/or the like. For example, the processing elements 405 may comprise programmable logic devices (CPLDs), microprocessors, coprocessing entities, application-specific instruction-set processors (ASIPs), integrated circuits, application specific integrated circuits (ASICs), field programmable gate arrays (FPGAs), programmable logic arrays (PLAs), hardware accelerators, other processing devices and/or circuitry, and/or the like. The term circuitry may refer to an entirely hardware embodiment or a combination of hardware and computer program products. In an example embodiment, the processing element 405 of the controller 30 comprises a clock and/or is in communication with a clock.

For example, the memory 410 may comprise non-transitory memory such as volatile and/or non-volatile memory storage such as one or more of as hard disks, ROM, PROM, EPROM, EEPROM, flash memory, MMCs, SD memory cards, Memory Sticks, CBRAM, PRAM, FeRAM, RRAM, SONOS, racetrack memory, RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. In various embodiments, the memory 410 may store qubit records corresponding the qubits of quantum computer (e.g., in a qubit record data store, qubit record database, qubit record table, and/or the like), a calibration table, an executable queue, computer program code (e.g., in a one or more computer languages, specialized controller language(s), and/or the like), and/or the like. In an example embodiment, execution of at least a portion of the computer program code stored in the memory 410 (e.g., by a processing element 405) causes the controller 30 to perform one or more steps, operations, processes, procedures and/or the like described herein for tracking the phase of an atomic object within an atomic system and causing the adjustment of the phase of one or more manipulation sources and/or signal(s) generated thereby.

In various embodiments, the driver controller elements 415 may include one or more drivers and/or controller elements each configured to control one or more drivers. In various embodiments, the driver controller elements 415 may comprise drivers and/or driver controllers. For example, the driver controllers may be configured to cause one or more corresponding drivers to be operated in accordance with executable instructions, commands, and/or the like scheduled and executed by the controller 30 (e.g., by the processing element 405). In various embodiments, the driver controller elements 415 may enable the controller 30 to operate a manipulation source 60. In various embodiments, the drivers may be laser drivers; vacuum component drivers; drivers for controlling the flow of current and/or voltage applied to TT, RF, and/or other electrodes used for maintaining and/or controlling the atomic object trapping potential of an elliptical atomic object trap 200; cryogenic and/or vacuum system component drivers; and/or the like. For example, the drivers may control and/or comprise TT and/or RF voltage drivers and/or voltage sources that provide voltages and/or electrical signals to the TT electrodes and/or RF electrodes via a plurality of leads. In various embodiments, the controller 30 comprises means for communicating and/or receiving signals from one or more optical receiver components such as cameras, MEMS cameras, CCD cameras, photodetectors, photodiodes, photomultiplier tubes, and/or the like. For example, the controller 30 may comprise one or more analog-digital converter elements 425 configured to receive signals from one or more optical receiver components, calibration sensors, and/or the like.

In various embodiments, the controller 30 may comprise a communication interface 420 for interfacing and/or communicating with a computing entity 10. For example, the controller 30 may comprise a communication interface 420 for receiving executable instructions, command sets, and/or the like from the computing entity 10 and providing output received from the quantum computer 110 (e.g., from an optical collection system) and/or the result of a processing the output to the computing entity 10. In various embodiments, the computing entity 10 and the controller 30 may communicate via a direct wired and/or wireless connection and/or one or more wired and/or wireless networks 20.

Exemplary Computing Entity

Referring now to FIG. 5, an example computing entity 10 is illustrated. The example computing entity may be used in conjunction with embodiments of the present invention. In various embodiments, a computing entity 10 is configured to allow a user to provide input to the quantum computer system 100 (e.g., via a user interface of the user computing entity 10) and receive, view, and/or the like output from the quantum computer system 100.

As shown in FIG. 5, a computing entity 10 can include an antenna 512, a transmitter 504 (e.g., radio), a receiver 506 (e.g., radio), and a processing element 508 that provides signals to and receives signals from the transmitter 504 and receiver 506, respectively. The signals provided to and received from the transmitter 704 and the receiver 706, respectively, may include signaling information/data in accordance with an air interface standard of applicable wireless systems to communicate with various entities, such as a controller 30, other computing entities 10, and/or the like. In this regard, the computing entity 10 may be capable of operating with one or more air interface standards, communication protocols, modulation types, and access types. For example, the computing entity 10 may be configured to receive and/or provide communications using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 10 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The computing entity 10 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Via these communication standards and protocols, the computing entity 10 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity 10 can also download changes, add-ons, and updates, for instance, to its firmware, software (e.g., including executable instructions, applications, program modules), and operating system.

According to one embodiment, the computing entity 10 may include location determining aspects, devices, modules, functionalities, and/or similar words used herein interchangeably. For example, the computing entity 10 may include outdoor positioning aspects, such as a location module adapted to acquire, for instance, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the user computing entity's 10 position in connection with a variety of other systems, including cellular towers, Wi-Fi access points, and/or the like. Similarly, the computing entity 10 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The computing entity 10 may also comprise a user interface device comprising one or more user input/output interfaces (e.g., a display 516 and/or speaker/speaker driver coupled to a processing element 508 and a touch screen, keyboard, mouse, and/or microphone coupled to a processing element 508). For instance, the user output interface may be configured to provide an application, browser, user interface, interface, dashboard, screen, webpage, page, and/or similar words used herein interchangeably executing on and/or accessible via the computing entity 10 to cause display or audible presentation of information/data and for user interaction therewith via one or more user input interfaces. The user input interface can comprise any of a number of devices allowing the computing entity 10 to receive data, such as a keypad 518 (hard or soft), a touch display, voice/speech or motion interfaces, scanners, readers, or other input device. In embodiments including a keypad 518, the keypad 518 can include (or cause display of) the conventional numeric (0-9) and related keys (#, *), and other keys used for operating the computing entity 10 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the user computing entity 10 can collect information/data, user interaction/input, and/or the like.

The computing entity 10 can also include volatile storage or memory 522 and/or non-volatile storage or memory 524, which can be embedded and/or may be removable. For instance, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the computing entity 10.

CONCLUSION

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An atomic object trap apparatus comprising:
   two or more radio frequency (RF) electrodes formed concentrically in a substantially elliptical shape, and
   three or more trapping and/or transport (TT) electrode sequences formed concentrically each in a substantially elliptical shape, the two or more RF electrodes and the three or more TT electrode sequences defining a substantially elliptically-shaped atomic object trap and at least one TT electrode sequence of the three or more TT electrode sequences being disposed concentrically between the two or more RF electrodes, wherein each substantially elliptically-shaped RF electrode and TT electrode sequence comprises two substantially parallel longitudinal regions and two arc-spanning beltway regions.

2. The atomic object trap apparatus of claim 1, wherein each substantially parallel longitudinal region of each of the three or more TT electrode sequences is arranged into a plurality of zones and each arc-spanning beltway region of the at least one TT electrode sequence disposed concentrically between the two or more RF electrodes comprises a plurality of TT electrodes arranged into three or more subgroups of TT electrodes.

3. The atomic object trap apparatus of claim 2, wherein the TT electrodes of each subgroup of TT electrodes are in electrical communication with each other.

4. The atomic object trap apparatus of claim 2, wherein the plurality of TT electrodes is arranged such that every $n^{th}$ TT electrode is associated with one subgroup of TT electrodes, wherein n is greater than 1.

5. The atomic object trap apparatus of claim 2, wherein each subgroup of TT electrodes is configured to be operated independently to at least one of (a) create a plurality of potential wells, or (b) move a potential well.

6. The atomic object trap apparatus of claim 5, wherein creating a plurality of potential wells and moving a potential well are configured to cause at least one atomic object within the defined atomic object trap to be transported from a first longitudinal region of a RF electrode to a second longitudinal region of the RF electrode.

7. The atomic object trap apparatus of claim 6, wherein the at least one atomic object comprises an ion-crystal, the ion-crystal comprising a qubit atomic object and a sympathetic cooling (SC) atomic object.

8. The atomic object trap apparatus of claim 2, wherein the plurality of zones comprises a plurality of gating zones and a plurality of auxiliary zones.

9. The atomic object trap apparatus of claim 8, wherein each gating zone is disposed between two auxiliary zones, the gating zone configured for an action to be performed on at least one atomic object within the gating zone and the two auxiliary zones configured for stabilizing the at least one atomic object during a transport operation of the at least one atomic object.

10. The atomic object trap apparatus of claim 9, wherein the action comprises at least one of (a) a split operation, (b) a combine operation, or (c) a swap operation, the action being caused at least in part by a manipulation source.

11. The atomic object trap apparatus of claim 10, wherein the manipulation source is a laser beam, the laser beam being configured to act as a manipulation source for one or more gating zones.

12. The atomic object trap apparatus of claim 8, wherein each gating zone of the at least one TT electrode sequence disposed concentrically between the two or more RF electrodes comprises at least 5 TT electrodes.

13. The atomic object trap apparatus of claim 8, wherein each auxiliary zone of the at least one TT electrode sequence disposed concentrically between the two or more RF electrodes comprises at least three TT electrodes.

14. The atomic object trap apparatus of claim 1, wherein at least one of the two arc-spanning beltway regions of the at least one TT electrode sequence disposed concentrically between the two or more RF electrodes comprises a load hole configured for loading atomic objects into the atomic object trap.

15. The atomic object trap apparatus of claim 1, wherein (a) the two or more RF electrodes are disposed between a first and third sequence of TT electrodes, (b) the two or more RF electrodes form at least one elliptical gap, and (c) a second sequence of TT electrodes is disposed within the elliptical gap.

16. The atomic object trap apparatus of claim 1, wherein the atomic object trap apparatus is part of a trapped ion quantum computer.

17. An atomic object trap apparatus comprising:
    a plurality of elliptically-shaped radio frequency (RF) electrodes, and
    a plurality of elliptically-shaped trapping and/or transport (TT) electrode sequences, the plurality of RF electrodes and the plurality of TT electrode sequences defining an atomic object trap, wherein the defined atomic object trap comprises a longitudinal gating region and two beltway regions.

18. The atomic object trap apparatus of claim 17, wherein the longitudinal gating region is arranged into a plurality of zones and the two beltway regions are configured to be operated so as to cause an atomic object within the atomic object trap to be transported from a first zone of the plurality of zones to a second zone of the plurality of zones.

19. The atomic object trap apparatus of claim 17, wherein each of the two beltway regions comprises a plurality of TT electrodes disposed between the RF electrodes, the plurality of TT electrodes being energized to generate a plurality of electrical potentials.

20. A method of operating a quantum computing system comprising an atomic object trap apparatus comprising:
    loading a plurality of atomic objects through a load hole located at an arc-spanning beltway region of a trapping and/or transport (TT) electrode sequence, wherein the TT electrode sequence is substantially elliptically-shaped and disposed between two substantially elliptically-shaped radio frequency (RF) electrodes, wherein each substantially elliptically-shaped TT electrode sequence and RF electrode comprises two substantially parallel longitudinal regions and two arc-spanning beltway regions;
cooling the plurality of atomic objects using a cooling laser beam;
detecting an amount of fluorescence emitted by the plurality of atomic objects; and
transporting the plurality of atomic objects, wherein the transporting generates at least one electrical potential configured to cause loading of a second plurality of atomic objects through the load hole.

* * * * *